United States Patent
Tomoike

Patent Number: 6,016,318
Date of Patent: *Jan. 18, 2000

[54] VIRTUAL PRIVATE NETWORK SYSTEM OVER PUBLIC MOBILE DATA NETWORK AND VIRTUAL LAN

[75] Inventor: Hiroyuki Tomoike, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/892,280

[22] Filed: Jul. 14, 1997

[30] Foreign Application Priority Data

Jul. 12, 1996 [JP] Japan .................................. 8-203015

[51] Int. Cl.⁷ .................................................. H04J 3/24
[52] U.S. Cl. ...................... 370/401; 370/338; 370/402; 709/249
[58] Field of Search .................................. 370/338, 329, 370/331, 401, 402; 455/517; 709/249

[56] References Cited

U.S. PATENT DOCUMENTS

| | | | |
|---|---|---|---|
| H1641 | 4/1997 | Sharman | 370/338 |
| 4,823,338 | 4/1989 | Chan et al. | 370/522 |
| 5,159,592 | 10/1992 | Perkins | 370/338 |
| 5,442,633 | 8/1995 | Perkins et al. | 370/331 |
| 5,533,029 | 7/1996 | Gardner | 370/329 |
| 5,600,644 | 2/1997 | Chang et al. | 370/404 |
| 5,636,216 | 6/1997 | Fox et al. | 370/402 |
| 5,737,525 | 4/1998 | Picazo, Jr. et al. | 370/351 |
| 5,771,459 | 6/1998 | Demery et al. | 455/517 |
| 5,812,552 | 9/1998 | Arora et al. | 370/401 |

FOREIGN PATENT DOCUMENTS

| | | |
|---|---|---|
| 5-327720 | 12/1993 | Japan . |
| 6-337824 | 12/1994 | Japan . |
| 7-170286 | 7/1995 | Japan . |
| 7-212364 | 8/1995 | Japan . |
| 9-130405 | 5/1997 | Japan . |
| 9-261265 | 10/1997 | Japan . |

*Primary Examiner*—Zarni Maung
*Assistant Examiner*—Philip B. Tran
*Attorney, Agent, or Firm*—Foley & Lardner

[57] ABSTRACT

In a virtual private network system accessed by an internet, a virtual local area network (LAN) is connected to a LAN emulation server and IAN emulation clients, and a router is connected between the internet and the virtual LAN. Also, a public mobile data network is connected to a location register and mobile data subscriber processing units, and a data gateway is connected between the internet and the public mobile data networks Further, a virtual private network gateway is connected between the virtual LAN and the public mobile data network. A mobile data terminal having one IP address and one public network address and can be connected to either one of the LAN emulation clients or one of the mobile data subscriber processing units.

12 Claims, 10 Drawing Sheets

VIRTUAL PRIVATE NETWORK SYSTEM OVER PUBLIC MOBILE DATA NETWORK AND VIRTUAL LAN

BACKGROUND OF THE INVENTION

1. Field of the Invention

The present invention relates to a virtual private network system over a public mobile data network and a virtual local area network (IAN).

2. Description of the Related Art

In a first prior art virtual private network system, a data gateway is connected between an internet and a public mobile data network. Also, a router is connected between the internet and a virtual LAN.

Assume that a data terminal is connected to one LAN emulation client within the virtual LAN. In this case, when data addressed to a first IP address of the data terminal is generated in the internet, the data always reaches the data terminal.

Next, assume that the data terminal is moved from the virtual LAN to a service area of the public mobile data network. Note that the data terminal has a second IP address under the public mobile data network. Even in this case, the data terminal can receive the same data service via the internet, thus realizing a virtual private network system over the public mobile data network and the virtual LAN.

The first prior art virtual private network system will be explained later in detail.

In the first prior art virtual private network system, however, since the data terminal has two IP addresses, an originator needs to know in advance whether the data terminal is under the virtual LAN or under the public mobile data network. This makes the control complex.

In a second prior art virtual private network system, the virtual LAN is connected as a sub network to the public mobile data network. In this case, note that the data terminal has only one IP address.

In the second prior art virtual private system, even if the data terminal is moved from the virtual LAN to a service area of the public mobile data network, the data terminal can receive the same data service via the internet, thus realizing a virtual private network system over the public mobile data network and the virtual LAN.

The second prior art virtual private network system will be explained later in detail.

In the second prior art virtual private network system, however, even when one data terminal under the virtual LAN wants to transfer data to the data terminal under the public mobile data network, such data cannot be transferred to the data terminal, since the network addresses of both of the data terminals are the same as each other. Thus, it is impossible to carry out communications between the data terminals belonging to the same virtual private network system.

SUMMARY OF THE INVENTION

It is an object of the present invention to provide a simply-controlled virtual private network system over a public mobile data network and a virtual LAN in which it is possible to carry out communications between all data terminals belonging the same virtual private network system.

According to the present invention, in a virtual private network system accessed by an internet, a virtual LAN is connected to a LAN emulation server and LAN emulation clients, and a router is connected between the internet and the virtual LAN. Also, a public mobile data network is connected to a location register and mobile data subscriber processing units, and a data gateway is connected between the internet and the public mobile data network. Further, a virtual private network gateway is connected between the virtual LAN and the public mobile data network. A mobile data terminal having one IP address and one public network address car be connected to either one of the LAN emulation clients or one of the mobile data subscriber processing units.

The virtual private network gateway serves as one LAN emulation server.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, prior art virtual private network systems will be explained with reference to FIGS. 1A, 1B and FIGS. 2A and 2B.

Figure 1A:
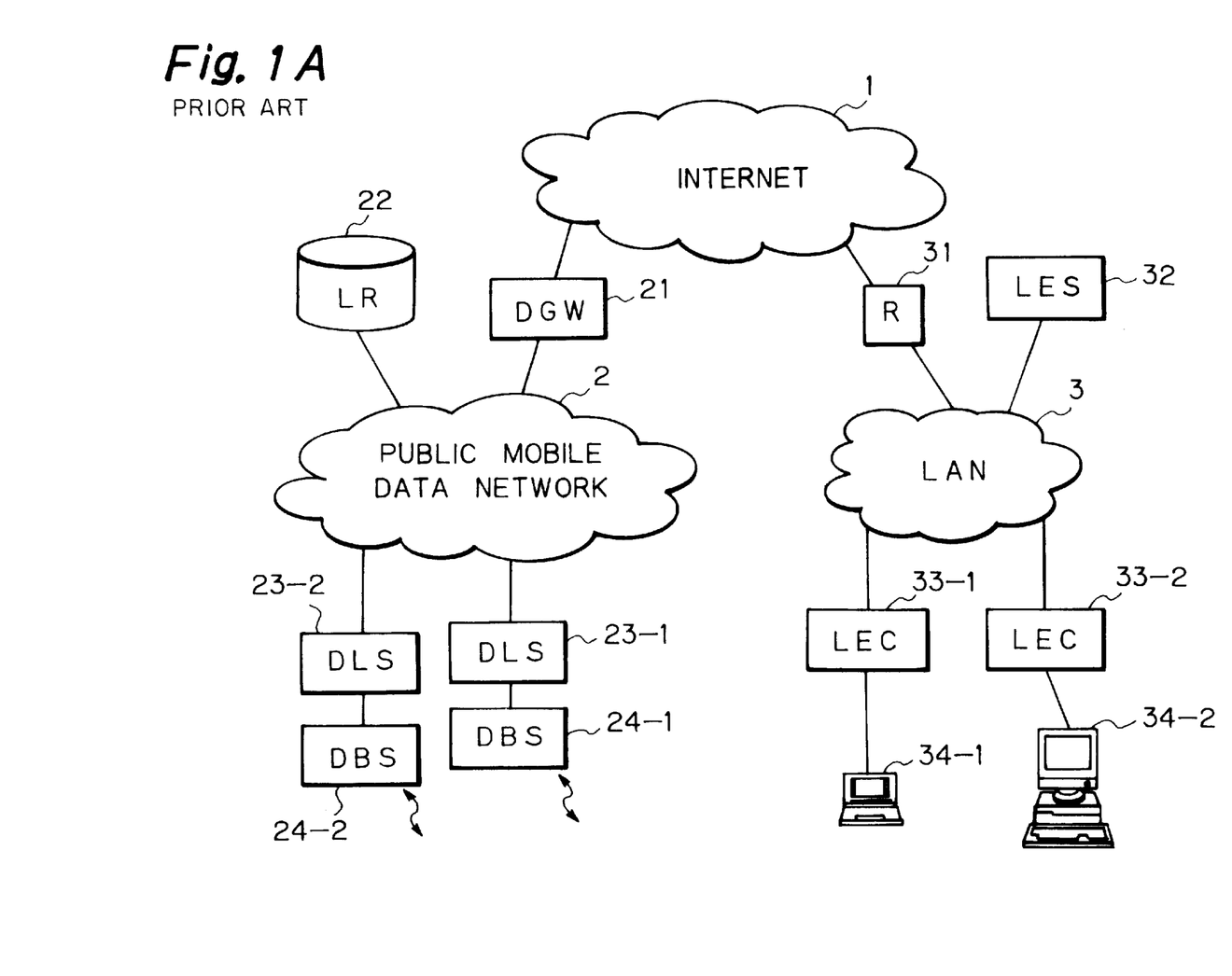
FIGS. 1A and 1B are diagrams illustrating a first prior art virtual private network system.
Figure 1B:
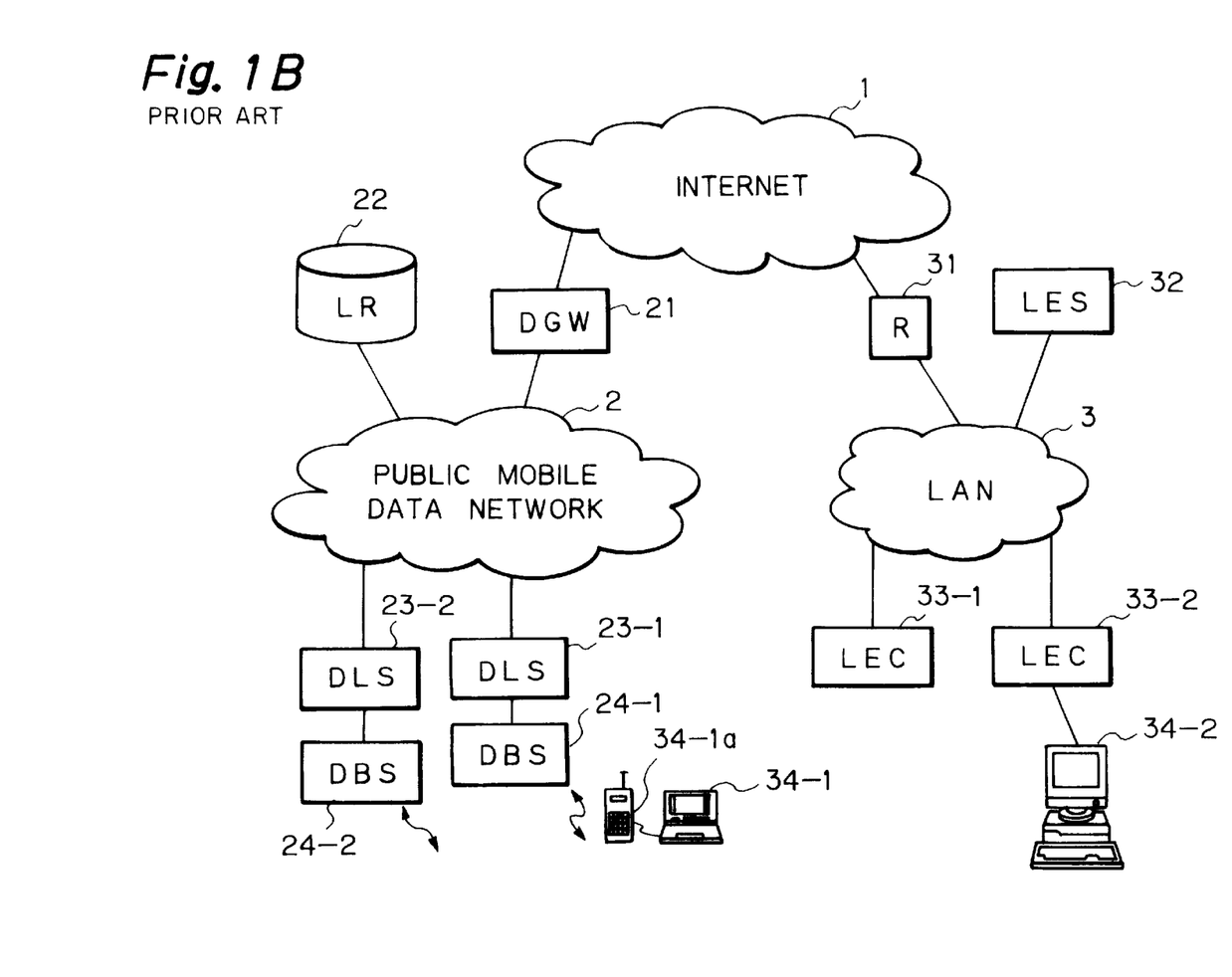

In FIGS. 1A and 1B, which illustrate a first prior art virtual private network system, reference numeral 1 designates an internet, 2 designates a public mobile data network, and 3 designates a virtual LAN achieved by an asynchronous transfer mode (ATM) LAN emulation based upon a LAN emulation Ver. 1.0 published in 1995.

A data gateway 21 is connected between the internet 1 and the public mobile data network 2. Also, a location register 22, and mobile data subscriber processing units 23-1 and 23-2 associated with mobile base stations 24-1 and 24-2 are connected to the public mobile data network 2. The data gateway 21 carries out conversion between Internet protocol (IP) addresses and subscriber numbers, and controls the pathway of an IP datagram as well as the location register 22. Also, the location register 22 serves as a database for storing location information of mobile data terminals and subscriber information. Further, the mobile data subscriber processing units 23-1 and 23-2 carry out data transfer between the public mobile data network 2 and the mobile base stations 24-1 and 24-2.

A router 31 is connected between the internet 1 and the virtual LAN 3. Also, a LAN emulation server 32 and a LAN emulation clients 33-1 and 33-2 associated with data terminals 34-1 and 34-2 are connected to the virtual LAN 3.

In the virtual LAN 3, the LAN emulation server 32 generates an address resolution protocol (ARP) request for the LAN emulation clients 33-1 and 33-2, which accordingly, return the IP addresses of the data terminals such as 34-1 and 34-2 connected thereto to the LAN emulation server 32. Therefore, the location of the data terminals 34-1 and 34-2 are registered in the LAN emulation server 32.

Data transfer from the internet 1 to the data terminal 34-1 located in the virtual LAN 3 will now be explained with reference to FIG. 1A.

First, when data addressed to a first IP address of the data terminal 34-1 under the virtual LAN 3 is generated in the internet 1, the router 31 recognizes that the data belongs to the virtual LAN 3 to take in this data.

Next, the router 31 issues an ARP request to the LAN emulation server 32 to recognize the LAN emulation client such as 33-1 to which the data terminal 34-1 is actually connected.

Finally, the router 31 transmits the data via the LAN emulation client 33-1 to the data terminal 34-1.

Thus, if the data terminal such as 34-1 is connected to one of the LAN emulation clients within the virtual LAN 3, data addressed to the data terminal 34-1 always reaches the data terminal 34-1.

Data transfer from the internet 1 to the data terminal 34-1 located in the public mobile data network 2 will be explained next with reference to FIG. 1B. That is, in this case, the data terminal 34-1 is moved from the virtual LAN 3 to a service area of the public mobile data network 2, and a mobile station 34-1a is connected to the data terminal 34-1. Note that the data terminal 34-1 has a second IP address under the public mobile data network 2.

First, when data addressed to the second IP address of the data terminal 34-1 under the public mobile data network 2 is generated in the internet 1, the data gateway 21 recognizes that the data belongs to the public data network 2 to take in this data.

Next, the data gateway 21 converts the second IP address into a network address for the public data network 2 in accordance with an incorporated lookup memory.

Next, the data gateway 21 accesses the location memory 22 by the network address to indicate the mobile data subsciber processing unit 23-1. As a result, the data is transferred to the mobile data subscriber processing unit 23-1.

Finally, the mobile data subscriber processing unit 23-1 calls for all the mobile base stations such as 24-1 under the unit 23-1. Then, after the mobile base station 24-1 responds to the unit 23-1, the data is transferred from the unit 23-1 to the mobile base station 24-1.

Thus, even if the data terminal such as 34-1 is moved from the virtual LAN 3 to the service area of the public mobile data network 2, the data terminal 34-1 can receive the same data service via the internet 1, thus realizing a virtual private network system over the public mobile data network 2 and the virtual LAN 3.

In the first prior art virtual private network system of FIGS. 1A and 1B, however, since the data terminal such as 34-1 has two IP addresses, an originator needs to know in advance whether the data terminal 34-1 is under the virtual LAN 3 or under the public mobile data network 2. This makes the control complex. Instead of the two IP addresses, the LAN emulation server 32 can resend received data with the second IP address to the public mobile data network 2, if the data terminal 34-1 is not under the virtual LAN 3. However, this also makes the control complex.

Figure 2A:
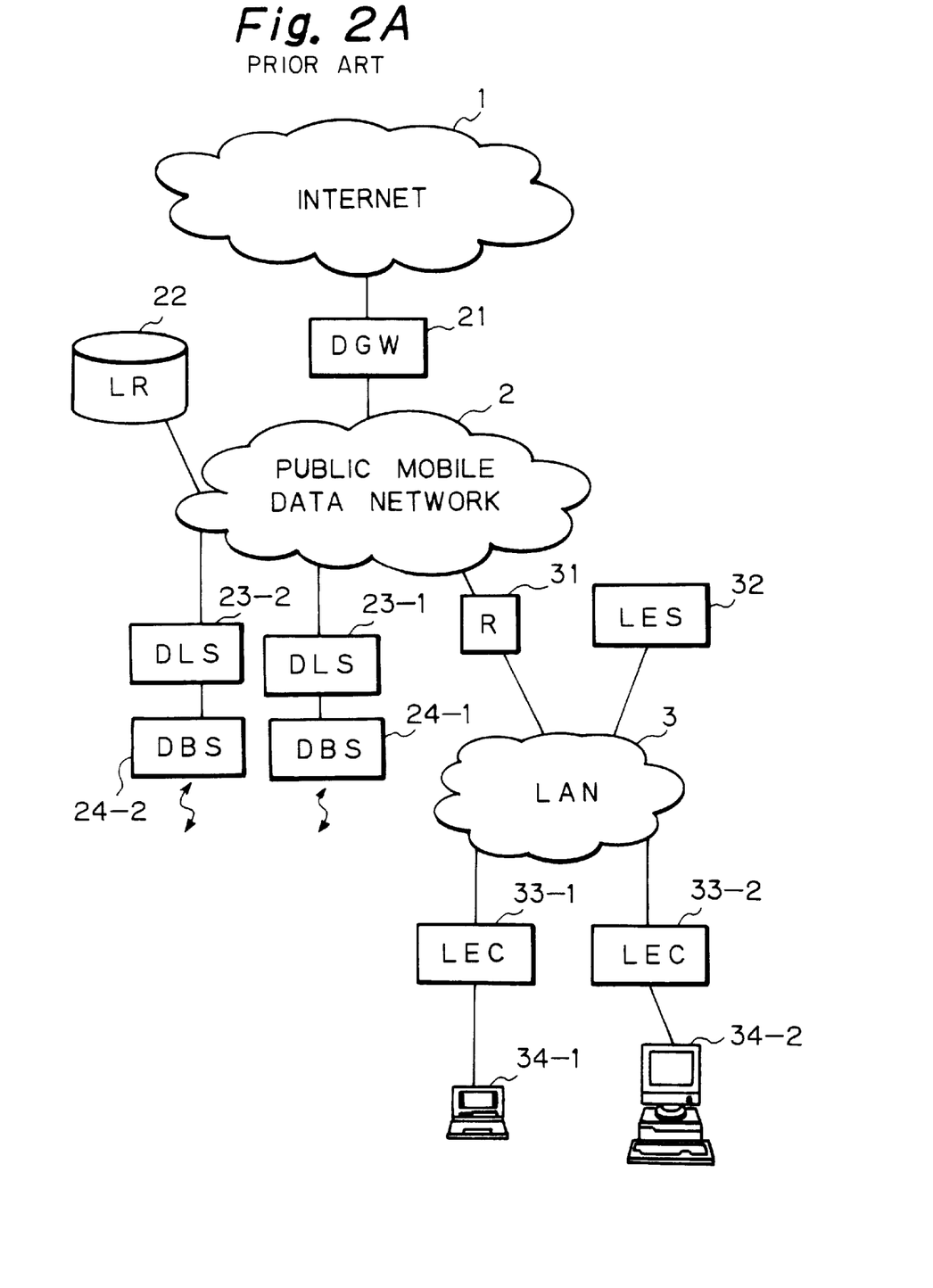
FIGS. 2A and 2B are diagrams illustrating a second prior art virtual private network system.
Figure 2B:
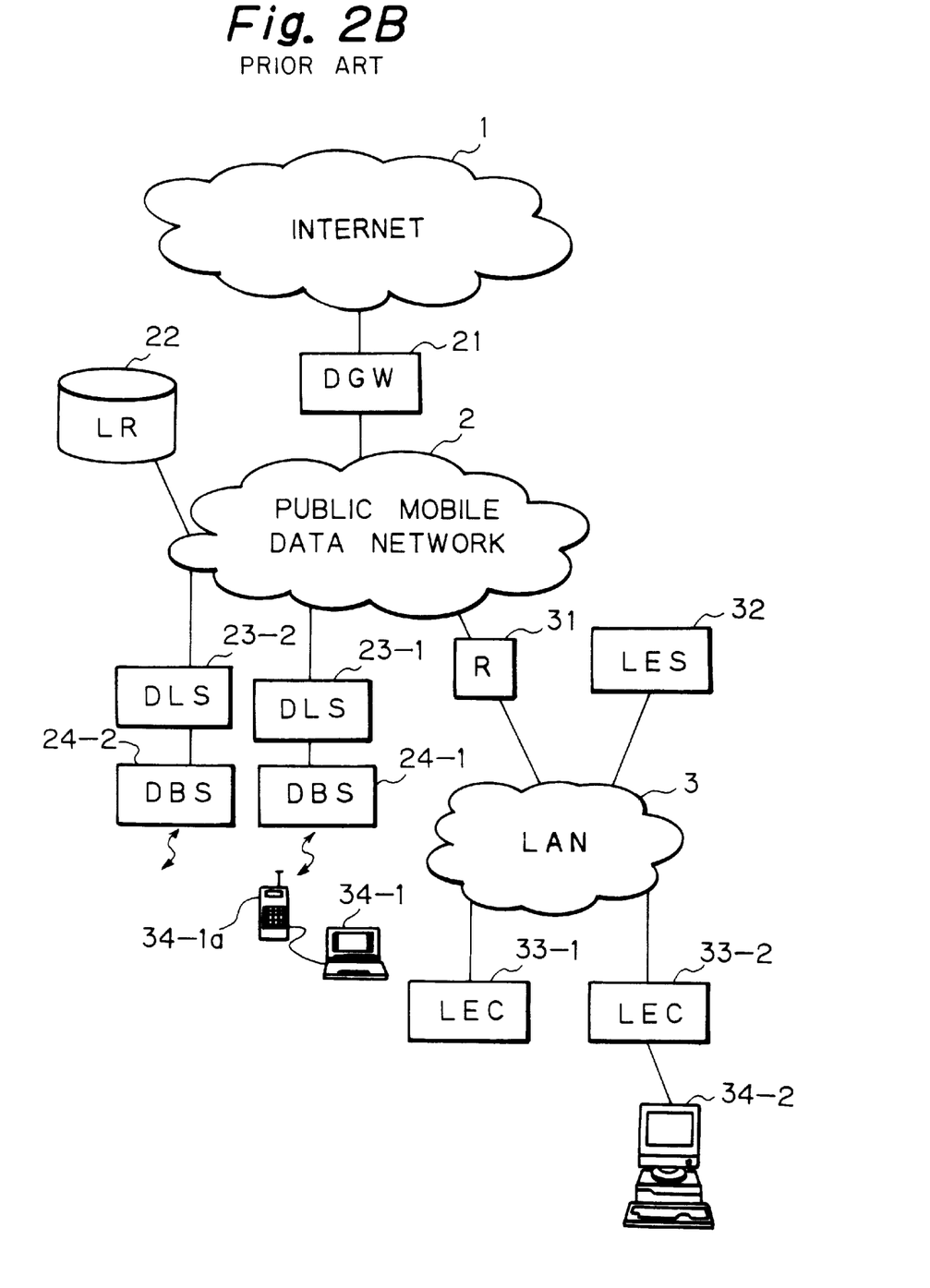

In FIGS. 2A and 2B, which illustrate a second prior art virtual private network system, the virtual LAN 3 of FIGS. 1A and 1B is connected as a sub network to the public mobile data network 2. In other words, the router 31 is connected between the public mobile data network 2 and the virtual LAN 3. In this case, note that the data terminal 34-1 has only one IP address.

Data transfer from the internet 1 to the data terminal 34-1 located in the virtual LAN 3 will be explained next with reference to FIG. 2A.

First, when data addressed to the IP address of the data terminal 34-1 is generated in the internet 1, the data gateway 21 recognizes that the data belongs to the public data network 2 to take in this data.

Next, the data gateway 21 converts the IP address into a network address for the public data network 2 in accordance with an incorporated lookup memory.

Next, the data gateway 21 accesses the location memory 22 by the network address to know whether the data terminal 34-1 is registered in the virtual LAN 3 or the public mobile data network 2. In this case, since the data terminal 34-1 is registered in the virtual LAN 3, the data is transferred to the router 31, so that the router 31 recognizes that the data belongs to the virtual LAN 3 to take in this data.

Next, the router 31 issues an ARP request to the LAN emulation server 32 to recognize the LAN emulation client such as 33-1 to which the data terminal 34-1 is actually connected.

Finally, the router 31 transmits the data via the LAN emulation client 33-1 to the data terminal 34-1.

Thus, if the data terminal such as 34-1 is connected to one of the LAN emulation clients within the virtual LAN 3, data addressed to the data terminal 34-1 always reaches the data terminal 34-1.

Data transfer from the internet 1 to the data terminal 34-1 located in the public mobile data network 2 will be explained next with reference to FIG. 2B. That is, in this case, the data terminal 34-1 is moved from the virtual LAN 3 to a service area of the public mobile data network 2, and the mobile station 34-1a is connected to the data terminal 34-1. In this case, note that it is registered in the location register 22 in advance that the data terminal 34-1 is under the public mobile data network 2, and is connected to the mobile data subscriber processing unit 23-1.

First, when data addressed to the IP address of the data terminal 34-1 is generated in the internet 1, the data gateway 21 recognizes that the data belongs to the public data network 2 to take in this data.

Next, the data gateway 21 converts the IP address into a network address for the public data network 2 in accordance with an incorporated lookup memory.

Next, the data gateway 21 accesses the location register 22 by the network address to indicate the mobile data subsciber processing unit 23-1. As a result, the data is transferred to the mobile data subscriber processing unit 23-1.

Finally, the mobile data subscriber processing unit 23-1 calls for all the mobile base stations such as 24-1 under the unit 23-1. Then, after the mobile base station 24-1 responds to the unit 23-1, the data is transferred from the unit 23-1 to the mobile base station 24-1.

Thus, even if the data terminal such as 34-1 is moved from the virtual LAN 3 to the service area of the public mobile data network 2, the data terminal 34-1 can receive the same data service via the internet 1, thus realizing a virtual private network system over the public mobile data network 2 and the virtual LAN 3.

In the second prior art virtual private network system of FIGS. 2A and 2B, however, if the data terminal 34-2 wants to transfer data to the data terminal 34-1 under the public mobile data network 2, such data cannot be transferred to the data terminal 34-1, since the network address of the data terminal 34-1 is the same as that of the data terminal 34-2. Thus, it is impossible to carry out communications between the data terminals belonging to the same virtual private network system.

Figure 3A:
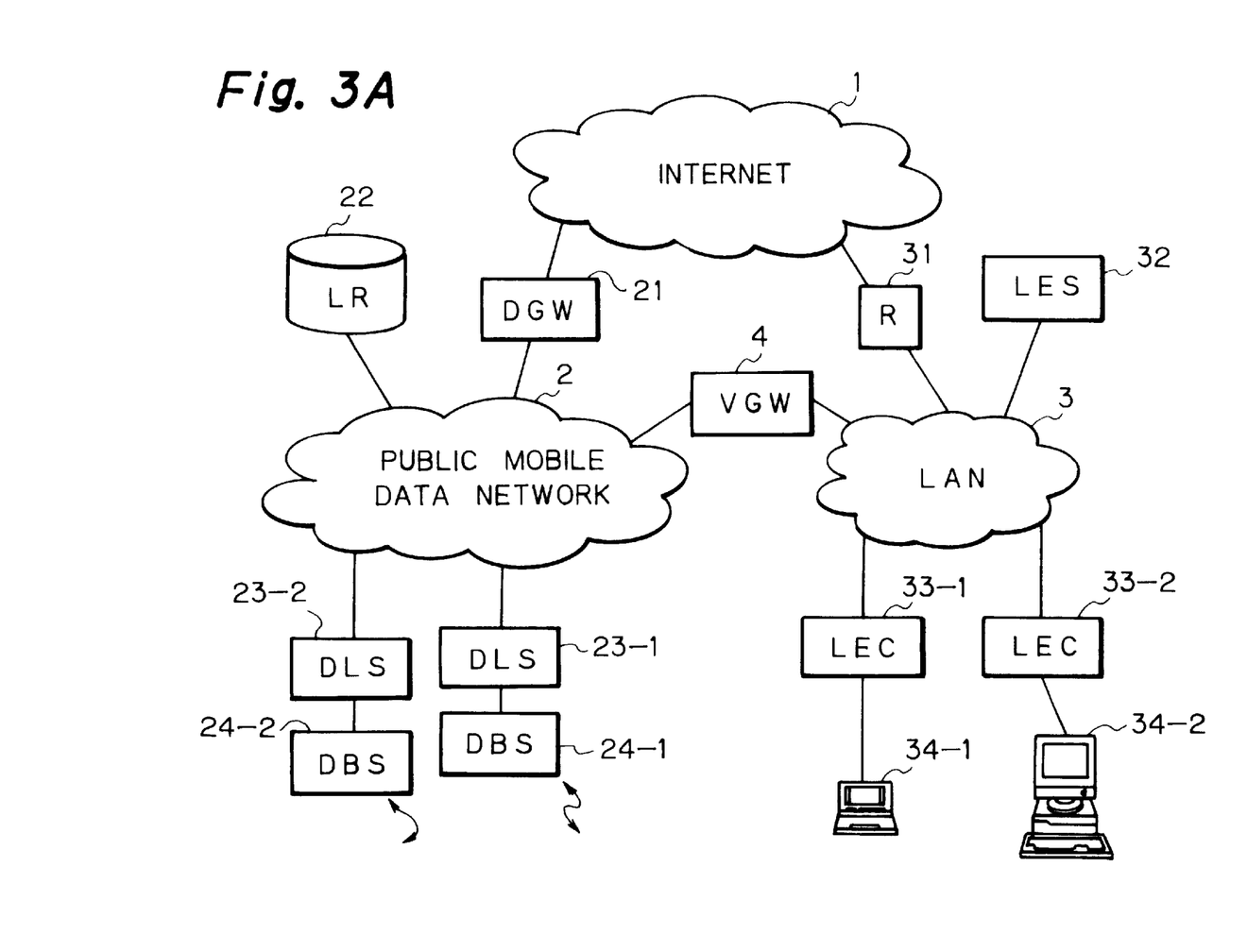
FIGS. 3A and 3B are diagrams illustrating an embodiment of the virtual private network system according to the present invention.
Figure 3B:
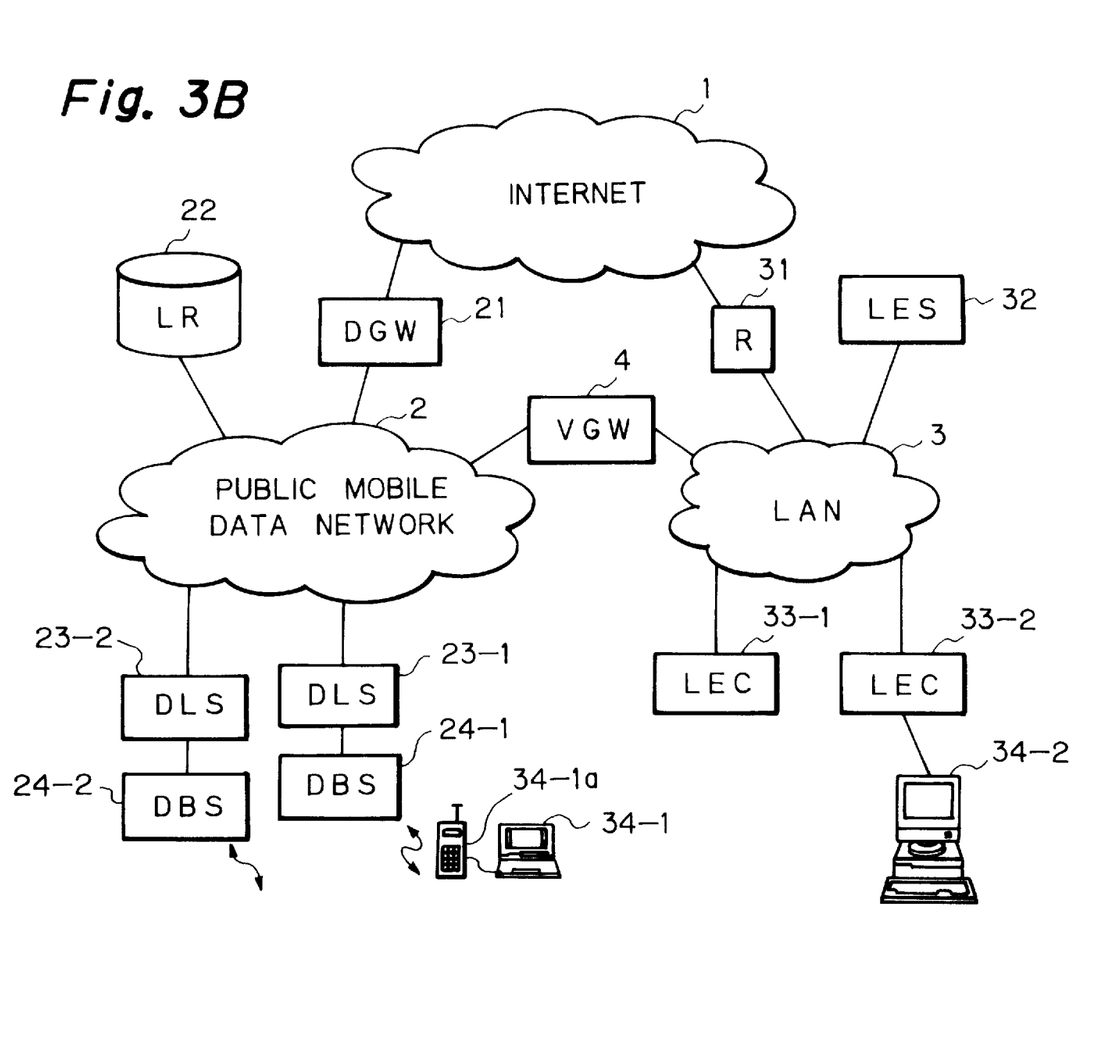

In FIGS. 3A and 3B, which illustrate an embodiment of the present invention, a virtual private network gateway 4 is connected between the public mobile data network 2 and the virtual LAN 3.

Figure 4:
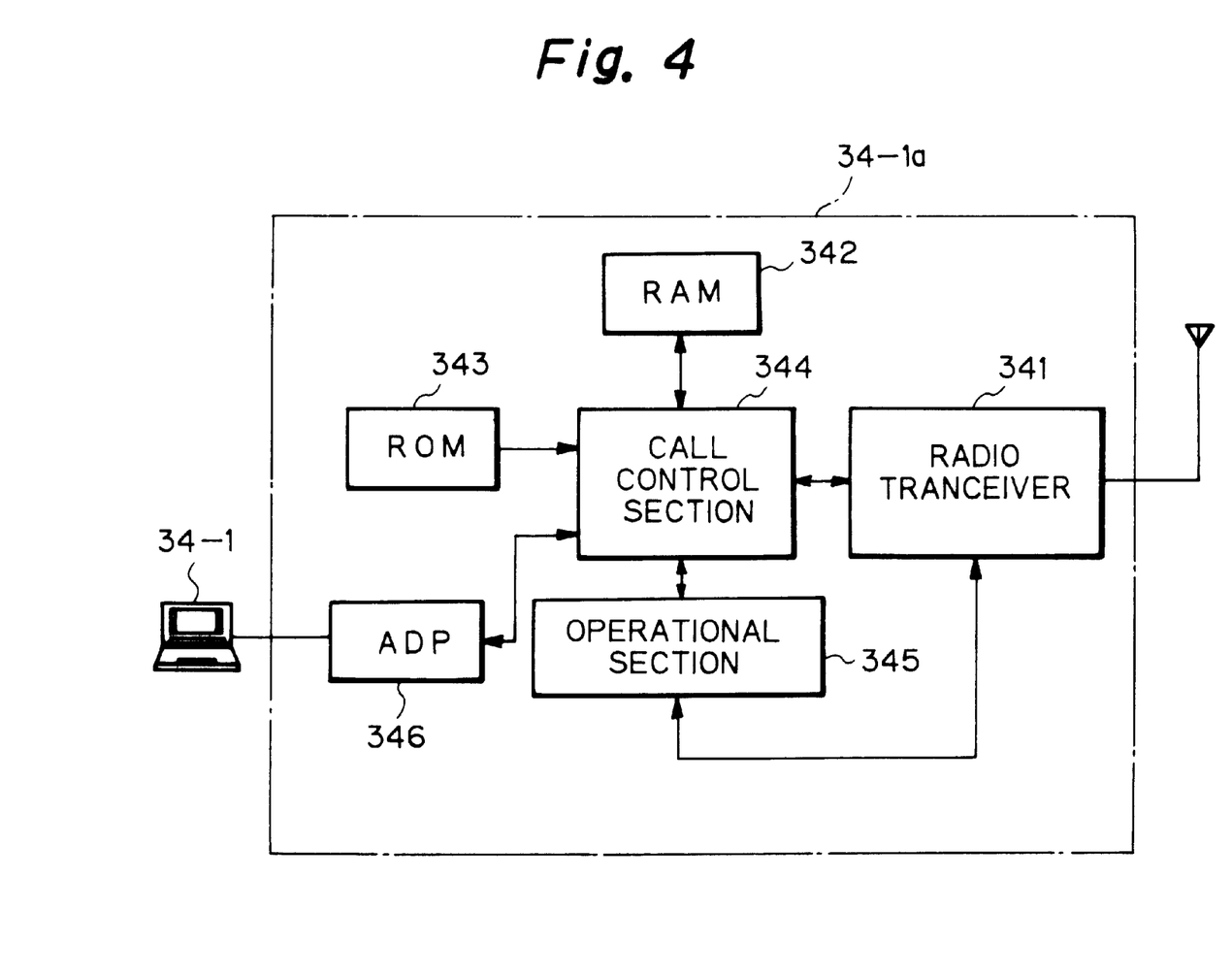
FIG. 4 is a detailed circuit diagram of the mobile station of FIG. 3B.

In FIG. 4, which is a detailed block circuit diagram of the mobile station 34-1a of FIG. 3B, reference numeral 341 designates a radio transceiver for the mobile base stations such as 24-1, 342 designates a random access memory (RAM) for storing an IP address of the data terminal 34-1, 343 designates a read-only memory (ROM) for storing a number of the mobile unit 34-1a and an approval key, 344 designates a call control section for processing a location registration to the public mobile data network 2 and the like, 345 designates an operational section for carrying out operations based upon a privacy key approval system, and 346 designates an interface for the data terminal 34-1.

In the mobile unit 34-1a of FIG. 4, when the data terminal 34-1 is connected to the interface 346, the IP address of the data terminal 34-1 is stored by the call control section 344 in the address lookup memory 342.

Figure 5:
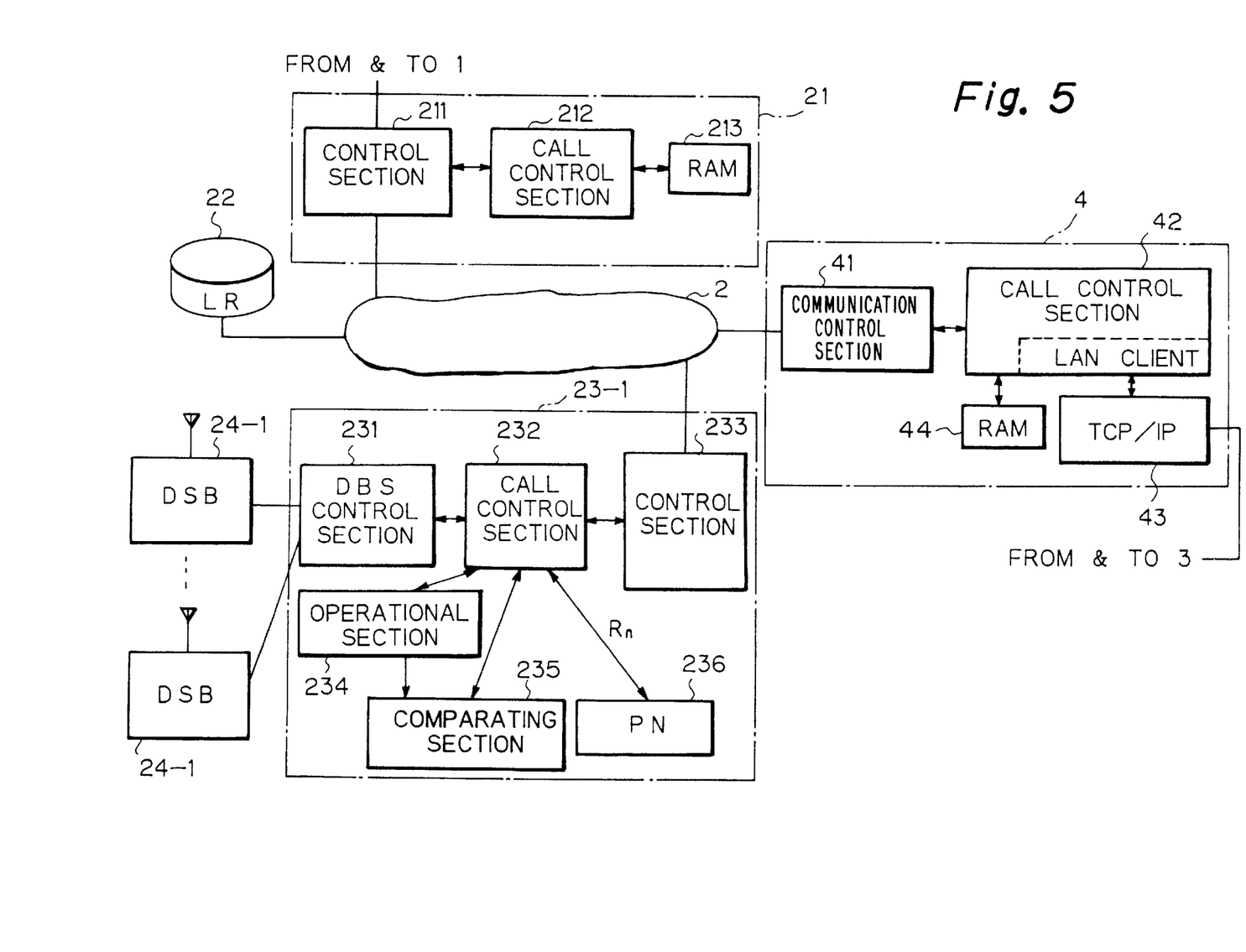
FIG. 5 is a detailed block circuit diagram of the data gateway, the mobile data subscriber processing unit and the virtual private network gateway of FIGS. 3A and 3B.

FIG. 5 is a detailed block circuit diagram of the data gateway 21, the mobile data subscriber processing unit 23-1 and the virtual private network gateway 4 of FIG. 3.

The data gateway 21 is formed by a communication control section 211 between the internet 1 and the public mobile data network 2, a call control section 212 for determining the location of mobile units by accessing the location register 22 and processing IP datagram, and an address lookup memory (RAM) 213 for storing a correspondence between IP addresses and public mobile data network addresses.

Also, the mobile data subscriber processing unit 23-1 is formed by a mobile base station controlling section 231, a call control section 232, a communication control section 233 for the public mobile data network 2, an operational section 234 for carrying out operations for approval processing, a comparing section 235 for comparing a privacy key with approval information, and a pseudo-random number generator 236 for the operational section 234.

Further, the virtual private network gateway 4 is formed by a communication control section 41 for the public mobile data network 2, a call control section 42 having a LAN emulation client function, an address lookup memory (RAM) 44 for storing a correspondence between IP addresses and public mobile data network addresses of mobile units, and a transmission control protocol/internet 43 protocol (TCP/IP) interface for the virtual LAN 3.

Data transfer from the internet 1 to the data terminal 34-1 located in the virtual LAN 3 as illustrated in FIG. 3A is the same as that in the first prior art virtual private network system as illustrated in FIG. 1A.

Figure 6:
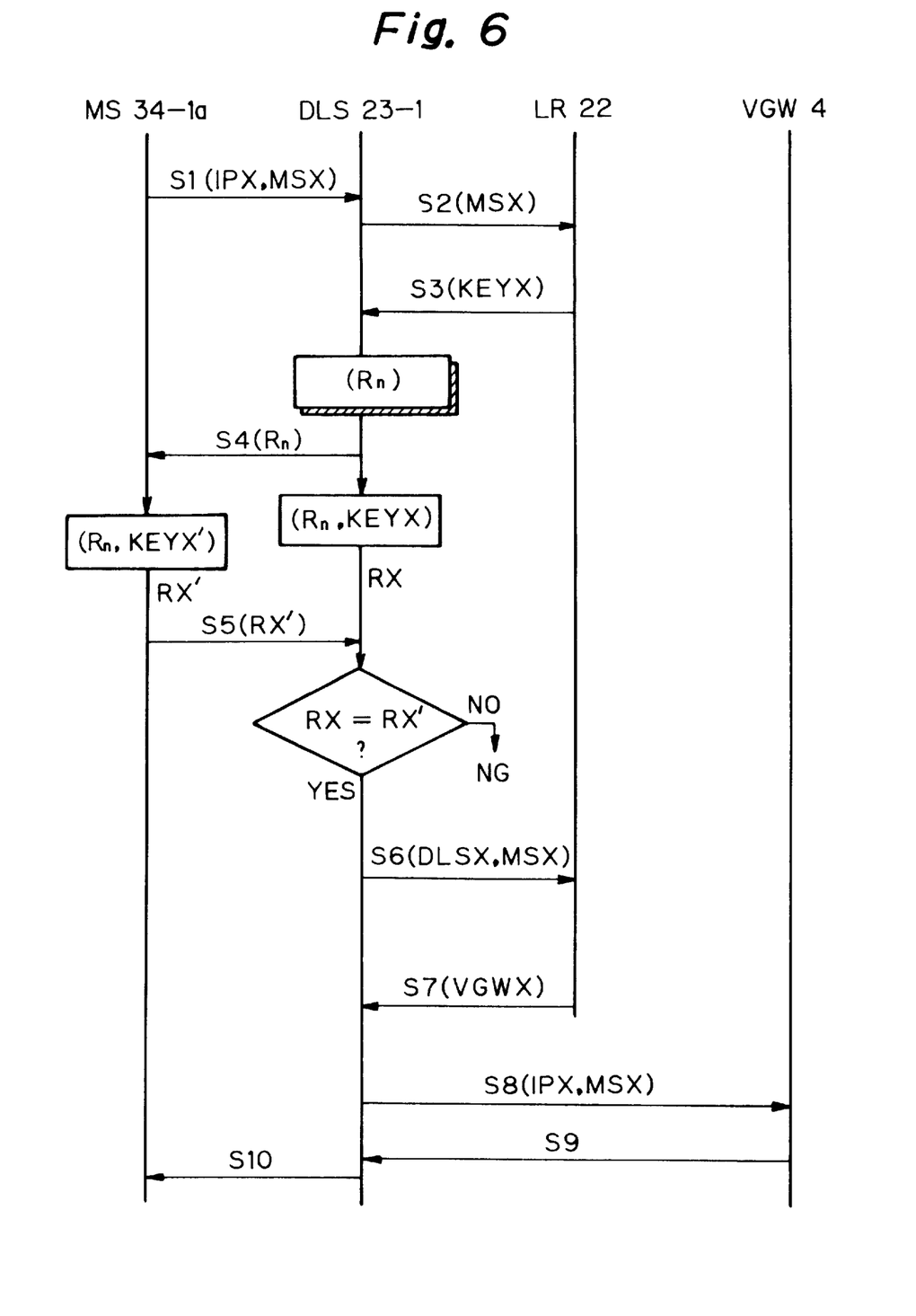
FIGS. 6 and 7 are sequence diagrams for showing the operation of the system of FIG. 3B.
Figure 7:
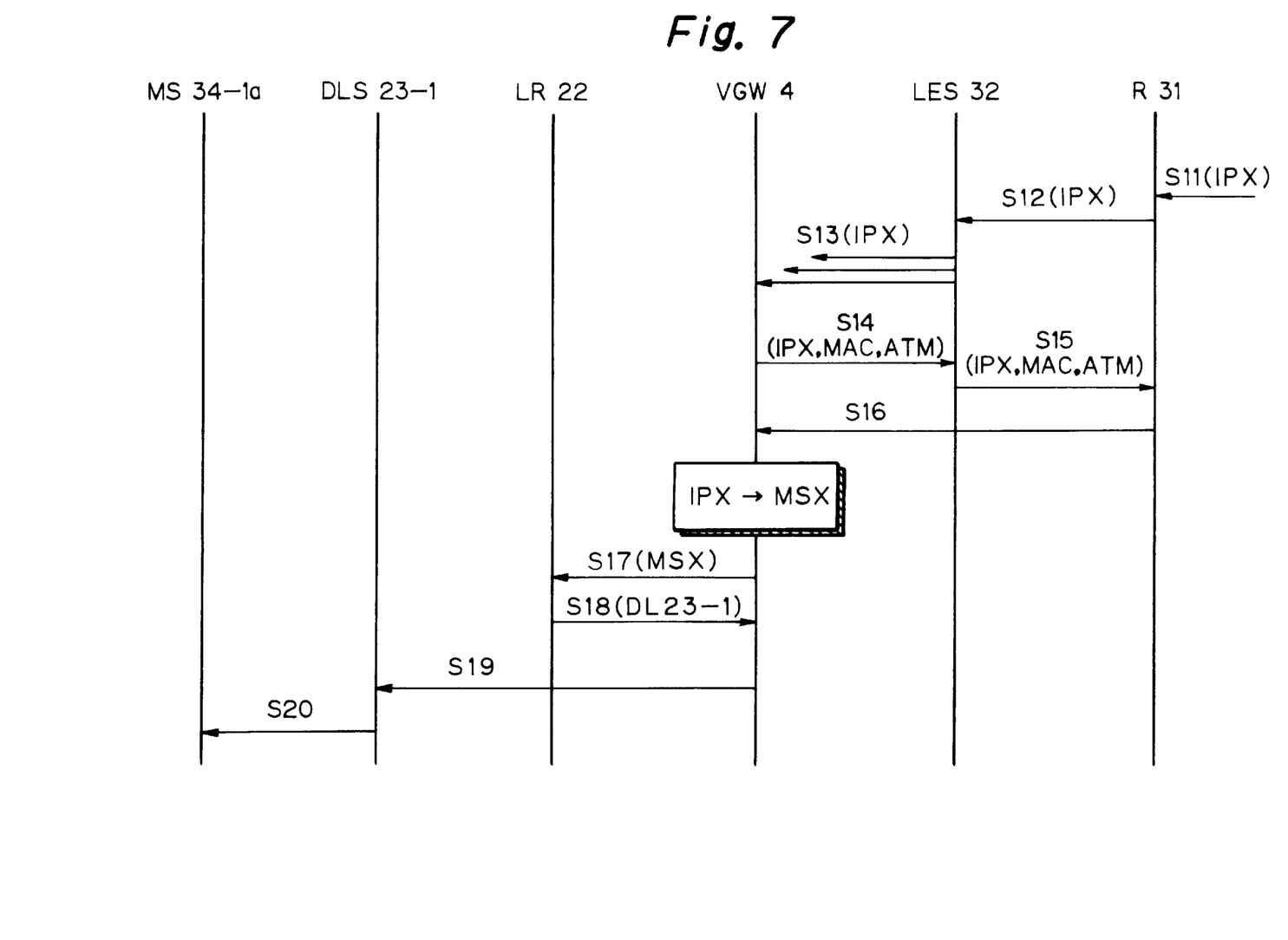

Data transfer from the internet 1 to the data terminal 34-1 located in the public mobile data network 2 as illustrated in FIG. 3B will be explained next with reference to FIGS. 6 and 7. In FIGS. 6 and 7, IPX is an IP address of the data terminal 34-1, MSX is a public mobile data network address of the mobile station 34-1a, and KEYX is an approval key of the mobile station 34-1a.

FIG. 6 is a procedure for registering the location of the data terminal 341 in the public mobile data network 2. Initially, when the data terminal 34-1 is connected to the mobile station 34-1a, the IP address IPX is written via the interface 346 into the RAM 342.

First, when the data terminal 34-1 associated with the mobile station 34-1a enters the service area of the public mobile data network 2, the mobile station 34-1a recognizes an information signal from the mobile base station such as 24-1. As a result, the mobile station 34-1a generates a location registration request signal S1 including the IP address IPX of the RAM 342 and the address MSX of the ROM 343 and transmits it to the mobile data subscriber processing unit 23-1.

Next, the call control section 232 of the mobile data subscriber processing unit 23-1 generates an approval request signal S2 including the address MSX of the mobile station 34-1a and transmits it to the location register 22.

Next, the location register 22 searches the approval key KEYX in accordance with the address MSX, so that the location register 22 generates an approval response signal S3 including the approval key KEYX and transmits it to the call control section 232 of the mobile data subscriber processing unit 23-1.

Next, the call control section 232 operates the pseudo-random number generator 236 to generate a pseudo-random number $R_n$. Then, the call control section 232 generates an approval request signal S4 including the pseudo-random number $R_n$.

In this state, in the mobile data subscriber processing unit 23-1, the operational section 234 carries out a calculation based upon the pseudo-random number $R_n$ and the approval key KEYX to obtain a result RX. Simultaneously, in the mobile station 34-1a, the operational section 345 carries out a calculation based upon the pseudo-random number $R_n$ and the approval key KEYX' stored in the ROM 343 to obtain a result RX'.

Next, the mobile station 34-1a generates an approval response signal S5 including the result RX'. Then, the comparing section 235 of the unit 23-1 compares the result RX with the result RX'. As a result, when RX=RX', the mobile data subscriber processing unit 23-1 generates a location registration request signal S6 including the location DLSX of the unit 23-1 and the address MSX of mobile station 34-1a and transmits it to the location register 22. On the other hand, when RX≠RX', the call processing is stopped.

Next, the location register 22 generates a location registration response signal S7 including the node number VGWX of the virtual private network gateway 4 and transmits it to the mobile data subscriber processing unit 23-1. In this case, note that the location register 22 recognizes that the mobile station 34-1a belongs to the virtual LAN 3 in advance.

Next, the mobile data subscriber processing unit 23-1 generates a location registration request signal S8 including the IP address IPX of the RAM 342 and the address MSX of the ROM 343 and transmits it to the virtual private network gateway 4 in accordance with the node number VGWX. As a result, the call control section 42 of the gateway 4 stores a correspondence between the IP address IPX and the address MSX of the mobile station 34-1a into the address lookup memory 44. Thereafter, the call control section 42 generates a location registration response signal S9 and transmits it to the mobile data subscriber processing unit 23-1.

Finally, the mobile data subscriber processing unit 23-1 generates a location registration response signal S10 and transmits it to the mobile station 34-1a, thus completing a location registration of the data terminal 34-1 in the public mobile data network 2.

FIG. 7 is a procedure for transferring data from the internet 1 to the data terminal 34-1 located in the public mobile data network 2.

First, when a data signal S11 addressed to the IP address IPX of the data terminal 34-1 is generated in the internet 1, the router 31 recognizes that the data belongs to the virtual LAN 3 to take in this data signal S11.

Next, the router 31 generates an ARP request signal S12 including the IP address IPX and transmits it to the LAN emulation server 32. In this case, if the LAN emulation server 32 per se has the IP address IPX by referring to its address lookup memory, the LAN emulation server 32 returns an ARP response to the router 32. Otherwise, the LAN emulation server 32 broadcasts an ARP request signal S13 including the IP address IPX to all the LAN emulation clients 33-1, 33-2, . . . , including the virtual private network gateway 4.

Next, the call control section 42 of the virtual private network gateway 4 recognizes the IP address IPX in accordance with the address lookup memory 44. As a result, the virtual private network gateway 4 generates an ARP response signal S14 including the IP address IPX, and a MAC address and an ATM address of the virtual private network gateway 4 and transmits it to the LAN emulation server 32.

Next, the LAN emulation server 32 stores the IP address IPX of the data terminal 34-1 in the address lookup memory thereof. Then, the LAN emulation server 32 generates an ARP response signal S15 including the IP address IPX, and the MAC address and ATM address of the virtual private network gateway 4 and transmits it to the router 31.

Next, the router 31 transmits a data signal S16 including the MAC address and the ATM address of the virtual private network gateway 4 as a header to the virtual private network gateway 4. As a result, the call control section 42 of the virtual private network gateway 4 converts the IP address IPX into the network address MSX of the mobile station 34-1a in accordance with the address lookup memory 44.

Next, the call control section 42 of the virtual private network gateway 4 transmits a data read request signal S17 including the network address MSX to the location register 22.

Next, the location register 22 returns a data read response signal S18 including the location of the mobile data subscriber processing unit 23-1.

Finally, the virtual private network gateway 4 transmits a data signal S19 to the mobile data subscriber processing unit 23-1, and accordingly, the latter transmits a data signal S20 the same as the data signal S19 via the mobile base station 24-1 to the mobile station 34-1a, i.e., the data terminal 34-1.

Thus, a virtual private network system is realized over the public mobile data network 2 and the virtual LAN 3.

As explained hereinabove, according to the present invention, since one data terminal can communicate with a virtual LAN and a public mobile data network by only one IP address, the control can be simple. Also, since the virtual private network gateway serves as one LAN emulation client, one data terminal under the virtual LAN can communicate with another data terminal under the public mobile data network.

I claim:

1. A virtual private network system accessed by an internet, comprising:

a virtual local area network (LAN) connected to a LAN emulation server and LAN emulation clients;

a router connected between said internet and said virtual LAN;

a public mobile data network connected to a location register and mobile data subscriber processing units;

a data gateway connected between said internet and said public mobile data network;

a virtual private network gateway connected between said virtual LAN and said public mobile data network; and a mobile data terminal having one internet protocol (IP) address and one network address of said public mobile data network and capable of being connected to either one of said LAN emulation clients or one of said mobile data subscriber processing units, wherein said location register storing a correspondence between said network address and one of said mobile data subscriber processing units, wherein said virtual private network gateway comprises:
a memory for storing a correspondence between said IP address and said network address of said mobile data terminal;
a communication control section communicatively connected to said public mobile data network;
a call control section having a LAN emulation capability; and
a transmission control protocol/internet protocol (TCP/IP) interface communicatively connected to said virtual LAN.

2. The system as set forth in claim 1, wherein said mobile data terminal comprises:

a radio transceiver for communicating with one of said mobile data subscriber processing units;

a memory for storing said IP address and said network address; and an operational unit for carrying out an approval processing.

3. A virtual private network system comprising:

a virtual local area network (LAN);

a public mobile data network;

a virtual private network gateway connected between said virtual LAN and said public mobile data network;

means for registering a correspondence between an internet protocol (IP) address and a public network address of a mobile data terminal in said virtual private network gateway, when said mobile data terminal enters in a service area of said public mobile data network; and means for transmitting data addressed to said IP address in said virtual LAN via said virtual private network gateway to said public mobile data network, said IP address being converted into said public network address in said virtual private network gateway, wherein said means for transmitting sends said data via said virtual private network gateway to said mobile data terminal only when said mobile data terminal is located in said public mobile data network.

4. The system as set forth in claim 1, wherein, when a call received from said internet is addressed using an IP address to said mobile data terminal, said router notifies all devices currently communicatively connected to said virtual LAN of said call, so that said mobile data terminal is capable of answering said call based on said notification if said mobile data terminal is currently communicatively coupled to said virtual LAN, and wherein, when said mobile data terminal is not currently communicatively connected to said virtual LAN, but is currently communicatively connected to said one of said mobile data subscriber processing units of said public mobile data network, said virtual private network gateway receives said notification and determines, based on current location information stored in said memory of said virtual private gateway network and based on information included with said notification, that said call is to be routed to said public mobile data network where said mobile data terminal is currently located, and said virtual private gateway network converts said IP address of said call to said network address that has been assigned to said one of said mobile data subscriber processing units that is currently communicatively connected to said mobile data terminal.

5. The system as set forth in claim 4, wherein, in the case where said mobile data terminal is currently located within said public mobile data network, said one of said mobile data subscriber processing units forwards said call to said mobile data terminal.

6. The system as set forth in claim 5, further comprising a mobile station that is communicatively coupled to said mobile terminal equipment when said mobile terminal equipment is located within said public mobile data network, wherein said mobile station is informed of an identifier of said data terminal equipment when said data terminal equipment is initially communicatively coupled to said mobile station, said mobile station forwarding said identifier to said one of said mobile data subscriber units which in turn forwards said identifier to said memory of said virtual private network gateway via said public mobile data network, and wherein said mobile station provides a communications link between said one of said one of said mobile data subscriber processing units and said data terminal equipment.

7. The system as set forth in claim 1, wherein said data terminal equipment is only communicatively connected to said virtual private network gateway via one of said virtual LAN and said public mobile data network.

8. A method for registering a location of a data terminal in a public mobile data network, comprising:

a) writing an IP address of the data terminal into a random access memory (RAM) of a mobile station that is communicatively connected to the data terminal;

b) recognizing, by the data terminal associated with the mobile station, an information signal from a mobile base station that services a portion of the public mobile data network;

c) generating, by the mobile station, a location registration request signal including the IP address stored in the RAM and a public mobile data network address of the mobile station that is stored in a read-only memory (ROM) of the mobile station;

d) transmitting the location registration request signal from the mobile station to a mobile data subscriber processing unit that constitutes an interface to the public mobile data network;

e) generating, by a call control section of the mobile data subscriber processing unit, an approval request signal including the public mobile data network address of the mobile station, and transmitting the approval request signal to a location register that is communicatively connected to the public mobile data network;

f) searching, by the location register, for a first approval key in accordance with the approval request signal;

g) if the searching is successful, generating and transmitting, by the location register to the call control section, an approval response signal including the first approval key;

h) generating, by the call control section, a pseudo-random number and transmitting the approval request signal along with the pseudo-random number;

i) carrying out, by the mobile data subscriber processing unit, a calculation based upon the pseudo-random number and the first approval key to obtain a first result, and simultaneously, in the mobile station, carrying out a calculation based on the pseudo-random number and a second approval key stored in the ROM of the mobile station to obtain a second result;

j) generating, by the mobile station, an approval response signal including the second result;

k) comparing, by the mobile data subscriber unit, the first and second results;

l) when there is a match as a result of the comparing performed in step k), generating and transmitting, to the location register, a location registration request signal that includes a location of the mobile data subscriber unit and the public mobile data network address of the mobile station; and m) when there is no match as a result of the comparing performed in step k), stopping any further call processing.

9. The method according to claim 8, further comprising the step of:

n) generating, by the location register, a location registration response signal including a node number of a virtual private gateway that communicatively connects the public mobile data network to a virtual local area network, and transmitting the location registration response signal to the mobile data subscriber processing unit, wherein the location register performs the generating and transmitting only when the location register recognizes that the mobile station belongs to the virtual local area network based on information stored at the location register.

10. The method according to claim 9, further comprising the step of:

o) generating, by the mobile data subscriber processing unit, a location registration signal that includes the IP address stored in the RAM and the public mobile data network address stored in the ROM, and transmitting the location registration signal to the virtual private gateway network in accordance with the node number of the virtual private gateway.

11. The method according to claim 10, further comprising the step of:

p) storing, in an address lookup memory at the virtual private gateway, a correspondence between the IP address and the public mobile data network address, and generating and transmitting a location registration response signal to the mobile data subscriber processing unit.

12. The method according to claim 11, further comprising the step of:
  q) generating, at the mobile data subscriber processing unit, a location registration response signal and transmitting the location registration response signal to the mobile station, in order to complete a location registration of the data terminal in the public mobile data network.

* * * * *